US009569731B2

(12) United States Patent
Doi et al.

(10) Patent No.: US 9,569,731 B2
(45) Date of Patent: Feb. 14, 2017

(54) QUANTUM COMMUNICATION DEVICE, QUANTUM COMMUNICATION METHOD, AND COMPUTER PROGRAM PRODUCT

(71) Applicant: Kabushiki Kaisha Toshiba, Minato-ku (JP)

(72) Inventors: Kazuaki Doi, Kawasaki (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 81 days.

(21) Appl. No.: 14/590,472

(22) Filed: Jan. 6, 2015

(65) Prior Publication Data
US 2015/0195087 A1 Jul. 9, 2015

(30) Foreign Application Priority Data
Jan. 8, 2014 (JP) ................................. 2014-001871

(51) Int. Cl.
H04L 9/08 (2006.01)
G06N 99/00 (2010.01)
(52) U.S. Cl.
CPC ........... *G06N 99/002* (2013.01); *H04L 9/0858* (2013.01)
(58) Field of Classification Search
CPC .. H04L 9/0855; H04L 2209/24; H04L 9/0858; G06N 99/002
See application file for complete search history.

(56) References Cited

U.S. PATENT DOCUMENTS 7,068,790 B1 * 6/2006 Elliott ................... H04L 9/0827
380/256
7,461,323 B2 12/2008 Matsumoto et al.
(Continued)

FOREIGN PATENT DOCUMENTS

JP 4346929 B2 10/2009
JP 4459526 B2 4/2010

OTHER PUBLICATIONS

Charles H. Bennett, et al., "Quantum Cryptography: Public Key Distribution and Coin Tossing", Proceedings of IEEE International Conference on Computers, Systems & Signal Processing, Bangalore, India, (Dec. 10-12, 1984), pp. 175-179.
(Continued)

*Primary Examiner* — Yonas Bayou
(74) *Attorney, Agent, or Firm* — Oblon, McClelland, Maier & Neustadt, L.L.P.

(57) ABSTRACT

According to an embodiment, a quantum communication device includes a receiver, a sift processor, an estimator, first and second storages, a determination unit, an error corrector, a measurement unit, and a privacy amplifier. The sift processor acquires sift processing data by referring to a cryptographic key bit string in a predetermined bit string with a reference basis randomly selected from a plurality of bases. The estimator acquires an estimated error rate by estimating an error rate of the sift processing data from an error rate of part of the sift processing data. When a sift processing data volume stored in the first storage is not smaller than a first threshold, the determination unit determines order of the sift processing data to be corrected based on an estimated error rate, an error rate range that a check matrix can correct, and estimated correction time, and the check matrix used for correction.

11 Claims, 11 Drawing Sheets

(56) References Cited

U.S. PATENT DOCUMENTS

| | | | | |
|---|---|---|---|---|
| 7,881,472 B2* | 2/2011 | Matsumoto | ........ | H03M 13/1102 380/260 |
| 8,054,976 B2* | 11/2011 | Harrison | ............. | G06Q 20/367 380/278 |
| 8,656,247 B2* | 2/2014 | Kyung | ............... | H03M 13/1111 714/758 |
| 9,172,698 B1* | 10/2015 | Evans | ................. | H04L 63/0853 |
| 2004/0120528 A1* | 6/2004 | Elliott | .................... | H04L 63/06 380/278 |
| 2005/0094818 A1* | 5/2005 | Inoue | ................... | H04L 9/0858 380/278 |
| 2009/0074192 A1* | 3/2009 | Beal | ...................... | H04L 9/0858 380/278 |
| 2010/0027794 A1* | 2/2010 | Yuan | ...................... | H04B 10/70 380/255 |
| 2011/0064222 A1* | 3/2011 | Wiseman | ............. | H04L 9/0827 380/255 |
| 2011/0085666 A1* | 4/2011 | Hicks | .................... | H04L 9/0852 380/278 |
| 2012/0087500 A1* | 4/2012 | Ukita | .................... | H04B 10/70 380/256 |
| 2013/0315395 A1* | 11/2013 | Jacobs | ................. | H04L 9/0852 380/278 |
| 2014/0095957 A1* | 4/2014 | Dixon | ............... | H03M 13/6312 714/755 |

OTHER PUBLICATIONS

Iris Choi, et al., "Quantum key distribution on a 10Gb/s WDM-PON", Optics Express 9601, vol. 18, No. 9, (Apr. 26, 2010), 13 pages.

Charles H. Bennett, et al., "Generalized Privacy Amplification", IEEE Transactions on Information Theory, vol. 41, No. 6, (Nov. 1995), pp. 1915-1923.

* cited by examiner

FIG.2

| QbER/CHECK MATRIX | Ha | Hb | Hc | Hd |
|---|---|---|---|---|
| $0 \leq$ QbER $<$ (5e-3) | Ha_1 | Hb_1 | Hc_1 | Hd_1 |
| (5e-3) $\leq$ QbER $<$ (1e-2) | Ha_2 | Hb_2 | Hc_2 | Hd_2 |
| (1e-2) $\leq$ QbER $<$ (1.5e-2) | × | Hb_3 | Hc_3 | Hd_3 |
| (1.5e-2) $\leq$ QbER $<$ (2e-2) | × | × | Hc_4 | Hd_4 |
| (2e-2) $\leq$ QbER $<$ (2.5e-2) | × | × | × | Hd_5 |
| (2.5e-2) $\leq$ QbER | × | × | × | × |

FIG.3

| CHECK MATRIX | Ha | Hb | Hc | Hd |
|---|---|---|---|---|
| ESTIMATED SWITCHING TIME | Ha_0 | Hb_0 | Hc_0 | Hd_0 |

FIG.4

| SIFT PROCESSING DATA | ESTIMATED QbER |
|---|---|
| Data (1) | 2.50E-03 |
| Data (2) | 1.20E-02 |
| Data (3) | 1.70E-02 |
| Data (4) | 3.00E-03 |
| Data (5) | 2.20E-02 |
| Data (6) | 3.00E-03 |
| Data (7) | 2.00E-02 |
| Data (8) | 1.75E-02 |

FIG.5

| SIFT PROCESSING DATA | CHECK MATRIX |
|---|---|
| Data (1) | Ha |
| Data (2) | Hb |
| Data (3) | Hc |
| Data (4) | Ha |
| Data (5) | Hd |
| Data (6) | Ha |
| Data (7) | Hd |
| Data (8) | Hc |

| SIFT PROCESSING DATA | CHECK MATRIX |
|---|---|
| Data (1) | Ha |
| Data (4) | Ha |
| Data (6) | Ha |
| Data (2) | Hb |
| Data (3) | Hc |
| Data (8) | Hc |
| Data (5) | Hd |
| Data (7) | Hd |

GROUP 1: Data (1), Data (4), Data (6)
GROUP 2: Data (2)
GROUP 3: Data (3), Data (8)
GROUP 4: Data (5), Data (7)

FIG.10

| ESTIMATED QbER | ESTIMATION ERROR |
|---|---|
| 0 ≤ QbER < (5e-3) | a |
| (5e-3) ≤ QbER < (1e-2) | b |
| (1e-2) ≤ QbER < (1.5e-2) | c |
| (1.5e-2) ≤ QbER < (2e-2) | d |
| (2e-2) ≤ QbER < (2.5e-2) | e |

QUANTUM COMMUNICATION DEVICE, QUANTUM COMMUNICATION METHOD, AND COMPUTER PROGRAM PRODUCT

CROSS-REFERENCE TO RELATED APPLICATION

This application is based upon and claims the benefit of priority from Japanese Patent Application No. 2014-001871, filed on Jan. 8, 2014; the entire contents of which are incorporated herein by reference.

FIELD

Embodiments described herein relate generally to a quantum communication device, a quantum communication method, and a computer program product.

BACKGROUND

Development of information and communication technology leads to an exchange of various types of data, and it is becoming a big problem how to ensure privacy (safety) of the data to be transmitted. Cryptographs currently used for ensuring privacy of data, such as RSA, base safety on cryptanalysis time by a computer based on computational complexity. However, further improvement in computational ability of a computer may allow easy cryptanalysis of RSA or the like.

In contrast, a quantum key distribution (QKD) system for achieving data privacy based on a physical law of light is known. The quantum key distribution system (quantum cryptographic communication system) is a system capable of detecting eavesdropping on a communication channel by handling a quantum state of light as data representing zero or one. The quantum key distribution system is expected as a cryptographic method for achieving information-theoretical safety that does not base safety on cryptanalysis time by a computer.

Generally in a quantum communication device used for a quantum key distribution system, error correcting (EC) processing and privacy amplification (PA) processing are performed.

However, conventional techniques have a problem that an increase in processing time related to error correction lowers throughput of the quantum communication device.

BRIEF DESCRIPTION OF THE DRAWINGS

FIG. 2 is a diagram illustrating an example of a check matrix and estimated correction time according to the first embodiment;

FIG. 3 is a diagram illustrating an example of estimated switching time of the check matrix according to the first embodiment;

FIG. 4 is a diagram illustrating an example of sift processing data (in time-series order) in a buffer according to the first embodiment;

FIG. 5 is a diagram illustrating an example of a temporary result of the check matrix determined by a determination unit according to the first embodiment;

FIG. 10 is a diagram illustrating an example of an estimation error of an estimated QbER according to the second embodiment;

DETAILED DESCRIPTION

According to an embodiment, a quantum communication device includes a receiver, a sift processor, an estimator, a first storage, a second storage, a determination unit, a corrector, a measurement unit, and a privacy amplifier. The receiver is configured to receive a cryptographic key bit represented by one basis among a plurality of bases using a quantum state of a photon via a quantum communication channel, and acquire a cryptographic key bit string including a plurality of received cryptographic key bits. The sift processor is configured to acquire sift processing data by referring to the cryptographic key bit string in a predetermined bit string with a reference basis randomly selected from the plurality of bases. The estimator is configured to acquire an estimated error rate by estimating an error rate of the sift processing data from an error rate of part of the sift processing data. The first storage is configured to store the sift processing data and the estimated error rate in association with each other. The second storage is configured to store a check matrix for checking the sift processing data, a range of an error rate that the check matrix can correct, and estimated correction time according to the range of the error rate of the check matrix so that the check matrix, the range of the error rate, and the estimated correction time are associated with one another. The determination unit is configured to determine order of the sift processing data in which an error is to be corrected based on the estimated error rate, the range of the error rate that the check matrix can correct, and the estimated correction time, and determine the check matrix to be used for correction when a data volume of the sift processing data stored in the first storage is equal to or greater than a first threshold. The corrector is configured to acquire one piece of the sift processing data from among the plurality of pieces of sift processing data from the first storage in the order determined by the determination unit, and generate error correcting processing data by correcting the acquired sift processing data by using the check matrix determined by the determination unit. The measurement unit is configured to measure the error rate of the sift processing data before correction by comparing the error correcting processing data with the sift processing data before the correction corresponding to the error correcting processing data. The privacy amplifier is configured to generate cryptographic key data by applying privacy amplification processing to the error correcting processing data based on the error rate measured by the measurement unit.

Embodiments of a quantum communication device, a quantum communication method, and a program will be described in detail below with reference to the accompanying drawings.

First Embodiment

Figure 1:
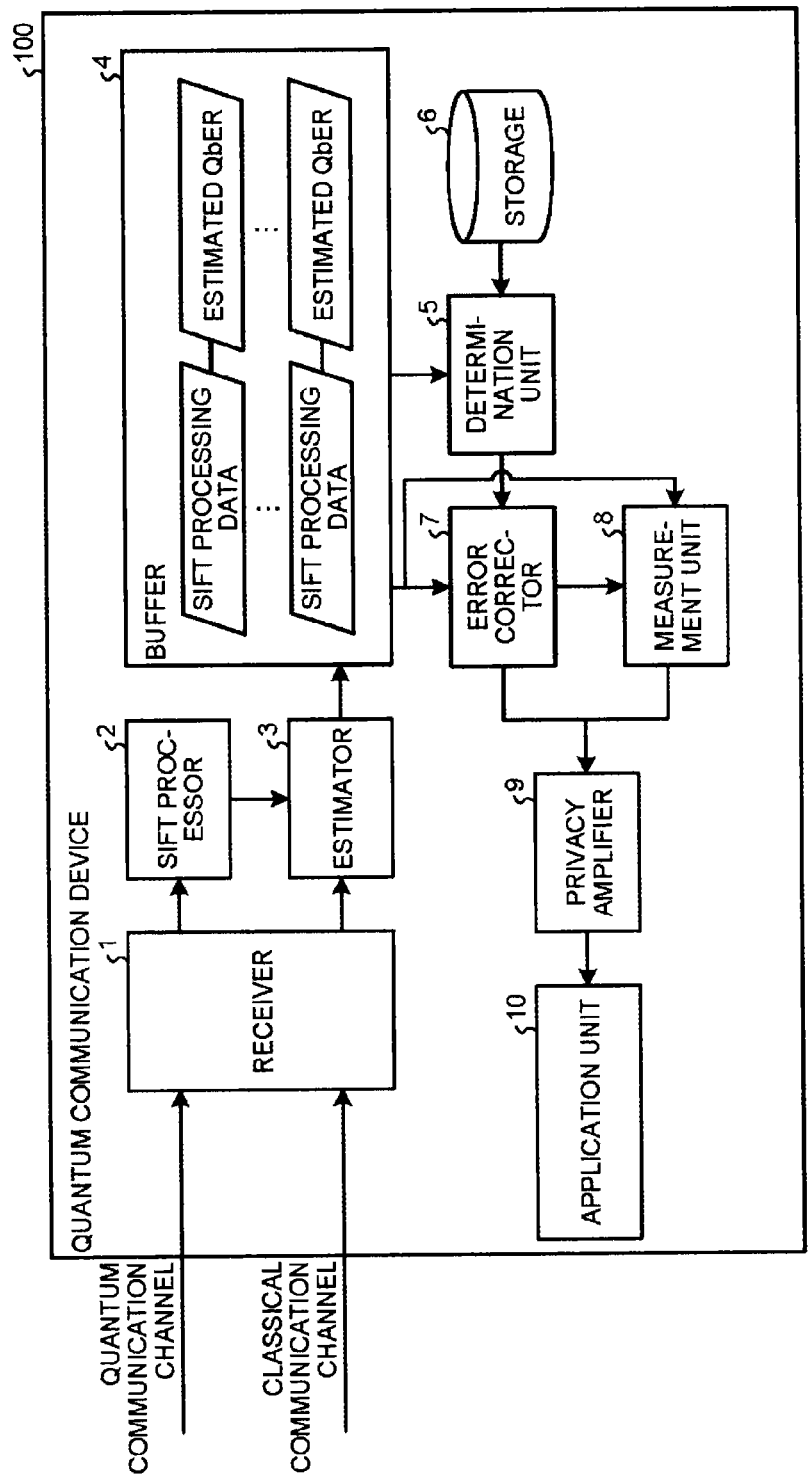
FIG. 1 is a diagram illustrating an example of a configuration of a quantum communication device according to a first embodiment.

FIG. 1 is a diagram illustrating an example of a configuration of a quantum communication device 100 according to a first embodiment. The quantum communication device 100 according to the first embodiment includes a receiver 1, a sift processor 2, an estimator 3, a buffer 4 (example of a first storage), a determination unit 5, a storage 6 (example of a second storage), an error correcting (EC) unit 7, a measurement unit 8, a privacy amplification (PA) unit 9, and an application unit 10.

The receiver 1 receives a cryptographic key bit from a transmission side device via a quantum communication channel using a quantum state of a photon. The transmission side device represents the cryptographic key bit by one basis among a plurality of bases using the quantum state of a photon. As the quantum state of a photon, polarization, phase, and the like of the photon are used. As the basis, when polarization is used, for example, rectilinear polarization (vertical (0) and horizontal (1)) or circular polarization (right-handed (0) and left-handed (1)) is used. The receiver 1 receives the plurality of cryptographic key bits via the quantum communication channel, and acquires a cryptographic key bit string including the plurality of received cryptographic key bits. A BB84 protocol is known as an example of a transmission/reception method of such a cryptographic key bit string. The receiver 1 transmits the cryptographic key bit string to the sift processor 2. The receiver 1 receives part of sift processing data, which will be described later, from the transmission side device via a classical communication channel (conventional communication channel) that is not the quantum communication channel. The receiver 1 transmits the part of the sift processing data, which will be described later, to the estimator 3.

The sift processor 2 receives the cryptographic key bit string from the receiver 1. The sift processor 2 refers to the cryptographic key bit string in a predetermined bit string to acquire a bit string (hereinafter referred to as "sift processing data") with a reference basis that a receiving side randomly selects from the plurality of bases. Here, when the basis used by the transmission side device does not coincide with the reference basis, the sift processor 2 does not use information about the cryptographic key bit. For example, when the cryptographic key bit is transmitted using the quantum state of rectilinear polarization of a photon, and when the sift processor 2 uses the quantum state of circular polarization of a photon as the reference basis, the sift processor 2 does not use information about the cryptographic bit. The sift processor 2 transmits the sift processing data to the estimator 3.

The estimator 3 receives the sift processing data from the sift processor 2, and receives part of the sift processing data from the receiver 1. The estimator 3 performs estimation processing of an estimated quantum bit error rate (QbER). Specifically, the estimator 3 compares part of the sift processing data that the receiver 1 receives via the classical communication channel with data corresponding to part of the sift processing data that the receiver 1 receives via the classical communication channel among the pieces of sift processing data received from the sift processor 2. Thus, the estimator 3 calculates a QbER of part of the sift processing data. The estimator 3 estimates the estimated QbER of the sift processing data from the QbER of part of the sift processing data. The estimator 3 associates the sift processing data with the estimated QbER of the sift processing data, and transmits the sift processing data and the estimated QbER to the buffer 4.

Here, the QbER (example of an error rate) will be described. In QKD, a cryptographic key bit string is transmitted for each cryptographic key bit (one bit) by using the quantum state of a quantum (photon). In accordance with an uncertainty principle that is one of basic principles of quantum mechanics, observation of a quantum changes the quantum state. This property causes the quantum state to change when an eavesdropper observes the quantum that includes the information about the cryptographic key bit that the transmission side device transmits on the quantum communication channel. This allows a receiving side device that receives the quantum to know that the quantum is observed by the eavesdropper. The QbER (quantum bit error rate) represents an error rate of the cryptographic key bit string resulting from changes in the quantum state. Variations in the QbER of the cryptographic key bit string transmitted on the quantum communication channel enables a check for the presence of eavesdropping on the quantum communication channel.

Specifically, when the eavesdropper eavesdrops on the cryptographic key bit string flowing through the quantum communication channel, the eavesdropper needs to eavesdrop on the cryptographic key bit string by a method identical to an acquisition method of the sift processing data by the above-mentioned sift processor 2. Accordingly, the eavesdropper can carry out successful eavesdropping only with a certain probability. For example, when there are two types of bases, the probability of successful eavesdropping will be ½. In addition, since the quantum state will change once the eavesdropper carries out eavesdropping, it is not possible to change the basis and to eavesdrop on the identical quantum state again. That is, since a correct value of the cryptographic key bit of which eavesdropping fails is unknown, even if the eavesdropper himself or herself creates the cryptographic key bit of which the eavesdropper fails in the eavesdropping and transmits the cryptographic key bit to the receiving side, it is not possible to transmit the correct value to the receiving side. This lowers the QbER calculated when the bases are consistent between the transmission side and the receiving side, and thus detects the eavesdropping. Even when the bases are consistent between the transmission side and the receiving side, since a constant QbER is obtained by noise on the quantum communication channel or by wrong detection by a photon-detecting device, the eavesdropping is detected when the constant QbER conspicuously varies.

The buffer 4 receives the sift processing data and the estimated QbER of the sift processing data. The buffer 4 associates the sift processing data with the estimated QbER of the sift processing data, and (temporarily) stores the sift processing data and the estimated QbER. The sift processing data in the buffer 4 is identified by identification information about the sift processing data. Examples of the identification information include address information that indicates a storage location of the sift processing data.

The determination unit 5 determines whether a data volume of the sift processing data stored in the buffer 4 is equal to or greater than a first threshold. When the data volume of the sift processing data stored in the buffer 4 is equal to or greater than the first threshold, the determination unit 5 determines order of the sift processing data in which an error is to be corrected based on the estimated QbER associated with the sift processing data, a range of the QbER that a check matrix can correct, estimated correction time according to the range of the QbER of the check matrix, and estimated switching time required for switching the check matrix. The determination unit 5 also determines the check matrix used for correction.

The check matrix and error correcting processing using the check matrix will be described now. The error correcting processing determines whether the sift processing data includes an error based on a result of multiplying the check matrix by the sift processing data (considering that the sift processing data is a vector having a component with a value of zero or one). This result is called a syndrome. The syndrome of a zero vector shows that the sift processing data does not include an error. The syndrome of not a zero vector shows that the sift processing data includes an error. Furthermore, in a resulting column vector, it is possible to specify (correct) a position of the error in the sift processing data depending on a position of the component that is not zero.

FIG. 2 is a diagram illustrating an example of the check matrix and the estimated correction time according to the first embodiment. In the present embodiment, four check matrices Ha, Hb, Hc, and Hd are used. Whether the check matrix is applicable and the estimated correction time of correction processing with the check matrix differ depending on a range of the QbER of a bit string to be examined. FIG. 2 represents the range of QbER as floating point numbers.

FIG. 2 will be specifically described by using the check matrix Ha as an example. The estimated correction time of the check matrix Ha is Ha_1 when $0 \leq QbER < (5e-3)$. The estimated correction time of the check matrix Ha is Ha_2 when $(5e-3) \leq QbER < (1e-2)$. FIG. 2 illustrates that the check matrix Ha cannot be used when $(1e-2)$ QbER. That is, it is necessary to use the check matrix (Hb, Hc, or Hd) having a higher error correcting capability than Ha when $(1e-2) \leq 5$ QbER. The error correcting capability of a check matrix is higher as a value of a correctable QbER increases. Generally, the correction processing using the check matrix takes longer time as the error correcting capability of the check matrix increases.

The estimated correction time is not only information that indicates time but may be arbitrary information according to an error correcting code used for correction by the error corrector 7, which will be described later. For example, for correction processing using a low-density-parity-check (LDPC) code, the number of repeated decoding or the clock number required for the correction processing may be used. The error corrector 7 may use a Reed-Solomon (RS) code and a Bose-Chaudhuri-Hocquenghem (BCH) code for correction as an error correcting code.

While the error corrector 7 corrects the sift processing data so that the syndrome becomes a zero vector, the error corrector 7 may correct the data so that the syndrome is a non-zero vector and coincides with a syndrome of the transmission side sift processing data. In correction, it is necessary to receive the transmission side syndrome from the transmission side device via the classical communication channel, and to input the syndrome into the error corrector 7.

FIG. 3 is a diagram illustrating an example of the estimated switching time of the check matrix according to the first embodiment. That is, FIG. 3 illustrates time required for the error corrector 7, which will be described later, to switch the check matrix used when correcting an error of the sift processing data. For example, time required for switching the check matrix to Ha is Ha_0.

In the quantum communication device 100 of the first embodiment, the range of the QbER that the check matrix can correct and the estimated correction time (see FIG. 2) according to the range of the QbER of the check matrix are stored in an estimated correction time database of the storage 6 in advance as estimated correction time data. Similarly, the estimated switching time (see FIG. 3) required for switching the check matrix is also stored in an estimated switching time database of the storage 6 in advance as estimated switching time data.

The data stored in the storage 6 may be updated (optimized) by the quantum communication device 100 feeding back relevant data (correction time and QbER) obtained by performing correction processing. This embodiment will be described later as a second embodiment.

Order in which the determination unit 5 corrects the sift processing data accumulated in the buffer 4 and a method of determining the check matrix to be used for correction will be specifically described.

FIG. 4 is a diagram illustrating an example of the sift processing data (in time-series order) in the buffer 4 according to the first embodiment. Specifically, FIG. 4 illustrates pieces of the sift processing data (Data (1) to Data (8)) and the estimated QbERs associated with pieces of the sift processing data in time-series order in which the sift processing data and the estimated QbERs are stored in the buffer 4. First, the determination unit 5 (temporarily) determines the check matrix to be used for error correction of each piece of the sift processing data from the estimated QbER of each piece of the sift processing data.

For example, for Data (1), the estimated QbER is 2.50E-3. The determination unit 5 specifies the check matrix that can correct QbER=2.50E-3 by referring to the estimated correction time data in the storage 6. This corresponds to a first row in the example of the estimated correction time data of FIG. 2, and all the check matrices (Ha, Hb, Hc, Hd) can correct the sift processing data associated with QbER=2.50E-3. As the check matrix for correcting Data (1), the determination unit 5 temporarily determines the check matrix Ha having the shortest estimated correction time (Ha_1). The determination unit 5 also determines the check matrices for correcting Data (2) to Data (8) by a similar procedure (see FIG. 5).

Next, the determination unit 5 performs correction order determination processing of the sift processing data. Specifically, the determination unit 5 creates one or more groups that each include the sift processing data using an identical check matrix, and calculates an average of the estimated QbERs for each of the groups from the estimated QbER of the sift processing data included in the group. The determination unit 5 then determines order of the groups in which an error is to be corrected in ascending order of the average of the estimated QbERs from the group having a smaller average of the estimated QbERs. That is, the determination unit 5 determines the order of the groups in which the group is to be corrected sequentially from the group that uses the check matrix having lower error correcting capability (see FIG. 6).

Next, the determination unit 5 performs optimization processing of the groups. Specifically, the determination unit 5 determines whether to change the check matrix to be used for correction of the sift processing data included in the group into the check matrix to be used in the group to be corrected next sequentially from the group having the smaller average of the estimated QbERs. More specifically, the determination unit 5 makes determination based on time required for correction of all the groups when the check matrix is not changed and time required for correction of all the groups when the check matrix is changed.

Figures 6, 7:
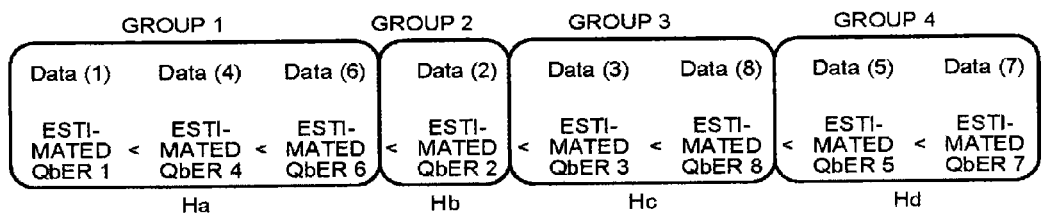
FIG. 6 is a diagram illustrating an example of processing order determined by the determination unit according to the first embodiment.
FIG. 7 is a diagram illustrating an example of processing for further changing the check matrix determined by the determination unit according to the first embodiment.

FIG. 7 is a diagram illustrating an example of processing for further changing the check matrix determined by the determination unit 5 of the first embodiment. The estimated QbERs 1 to 8 of FIG. 7 represent values of the estimated QbERs of FIG. 4. First, the determination unit 5 determines whether to change the check matrix Ha of the group 1 having the smallest average of the estimated QbERs into the check matrix Hb to be used in the group 2 to be corrected next.

First, the determination unit 5 calculates estimated processing time before the change by Equation (1) below. The estimated switching time for switching to the check matrix to be used for the next group is included in the estimated processing time before the change.

$$Ha(\text{estimated QbER 1}) + Ha(\text{estimated QbER 4}) + Ha(\text{estimated QbER 6}) + Hb\_0 = Ha\_1 + Ha\_1 + Ha\_1 + Hb\_0 \quad (1)$$

Next, the determination unit 5 calculates the estimated processing time after the change by Equation (2) below.

$$Hb(\text{estimated QbER 1}) + H(\text{estimated QbER 4}) + Hb(\text{estimated QbER 6}) = Hb\ 1 + Hb1 + Hb\ 1 \quad (2)$$

The determination unit 5 compares a calculation result (Ha_1+Ha_1+Ha_1+Hb 0) of Equation (1) with a calculation result (Hb_1+Hb_1+Hb_1) of Equation (2). When Ha_1+Ha_1+Ha_1+Hb_0>Hb_1+Hb_1+Hb_1, the determination unit 5 combines the group 1 and the group 2 into one group 12, and determines Hb as the check matrix to be used for the sift processing data of the group 12. This change is effective when the estimated switching time of the check matrix is much longer than the estimated correction time (correction time). That is, in cases of Equation (1) and Equation (2) described above, the estimated correction time (correction time) after the change can be significantly shortened when Hb_0>>3 (Hb_1-Ha_1).

Similarly, regarding the groups (group 12, group 3, and group 4) after the change, the determination unit 5 determines whether to change the check matrix Hb of the group 12 having the smallest average of the estimated QbERs into the check matrix Hc to be used in the group 3 to be corrected next time. Hereinafter, the determination unit 5 determines the check matrix to be finally used for each group (sift processing data) by repeating processing for determining whether to change the check matrix until the estimated processing time satisfies (estimated processing time before change)<(estimated processing time after change).

Returning to FIG. 1, the determination unit 5 transmits, to the error corrector 7, data indicating the order of the sift processing data to be corrected and data indicating the check matrix to be used for correction of each piece of the sift processing data.

The error corrector 7 receives, from the determination unit 5, the data indicating the order of the sift processing data to be corrected and the data indicating the check matrix to be used for correction of each piece of the sift processing data. The error corrector 7 performs correction processing of the sift processing data. Specifically, the error corrector 7 acquires one piece out of the plurality of pieces of sift processing data from the buffer 4 in the order determined by the determination unit 5. The error corrector 7 then generates error correcting processing data by correcting the acquired sift processing data by using the check matrix determined by the determination unit 5. The error corrector 7 transmits the error correcting processing data to the measurement unit 8 and the privacy amplifier 9.

The measurement unit 8 receives the error correcting processing data from the error corrector 7. The measurement unit 8 acquires the sift processing data before the correction corresponding to the error correcting processing data from the buffer 4. The measurement unit 8 measures the QbER of the sift processing data by comparing the error correcting processing data with the sift processing data before the correction corresponding to the error correcting processing data. The measurement unit 8 transmits the measured QbER to the privacy amplifier 9.

The privacy amplifier 9 receives the error correcting processing data from the error corrector 7, and receives the QbER of the error correcting processing data from the measurement unit 8. The privacy amplifier 9 performs privacy amplification processing of the error correcting processing data based on the QbER of the error correcting processing data. The privacy amplifier 9 then generates cryptographic key data to be shared with the transmission side device by using the bit string obtained by the privacy amplification processing of the error correcting processing data. The privacy amplification processing is processing for removing information disclosed in a process of performing error correction. Since the privacy amplification processing is already well known, detailed description will be omitted. For example, details of the privacy amplification processing are disclosed in Charles H. Bennett, Gilles Brassard, Claude Crepeau, and Ueli M. Maurer, "Generalized Privacy Amplification", IEEE Transactions on Information Theory, Vol. 41, No. 6, November 1995. The privacy amplifier 9 transmits the generated cryptographic key data to the application unit 10.

The application unit 10 receives the cryptographic key data from the privacy amplifier 9. The application unit 10 performs data encryption and decryption by using the cryptographic key data. The application unit 10 transmits and receives the encrypted data with the transmission side device.

Figure 8:
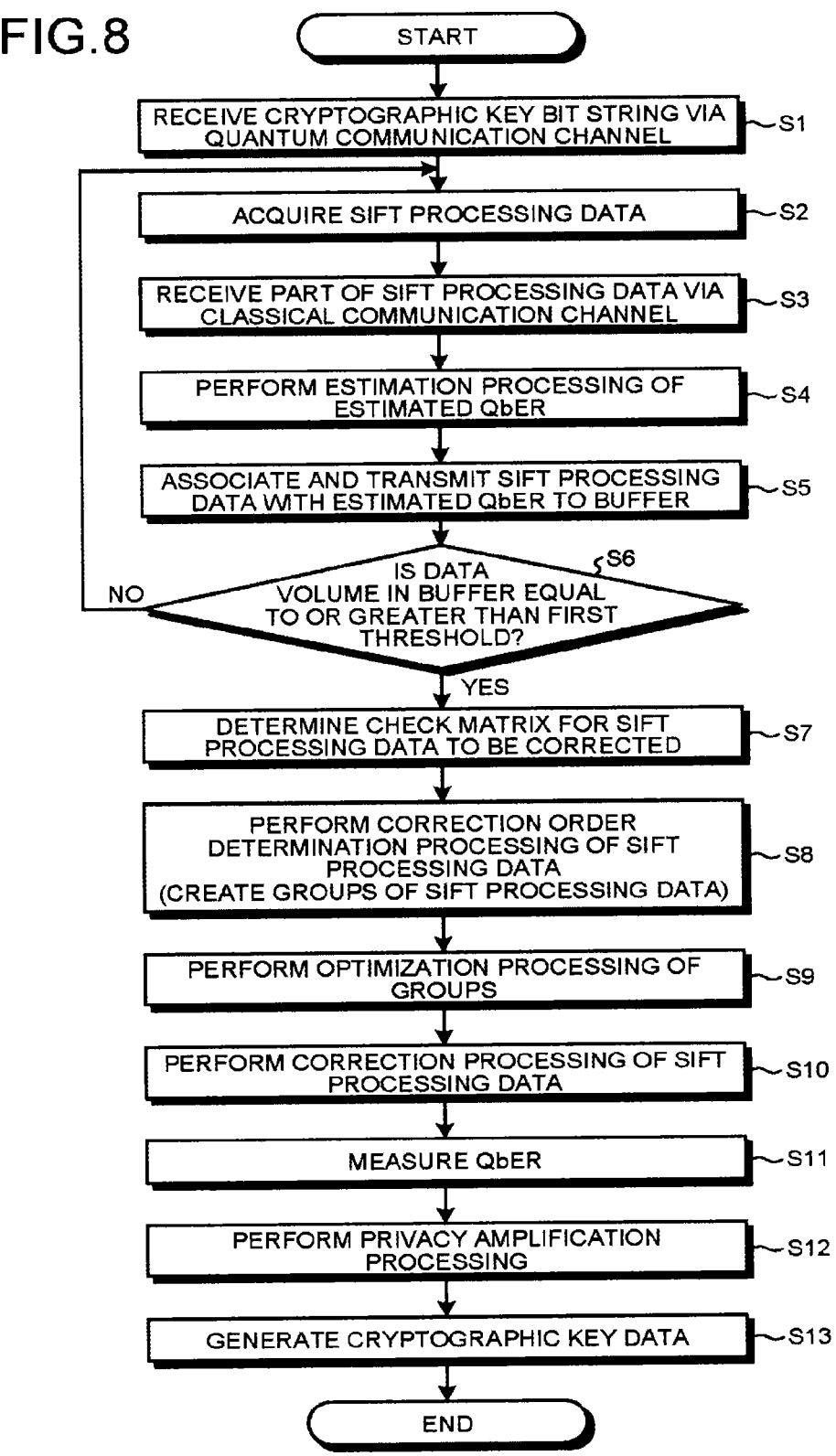
FIG. 8 is a flow chart illustrating an example of a quantum communication method according to the first embodiment.

Next, a quantum communication method of the first embodiment will be described with reference to a flow chart. FIG. 8 is a flow chart illustrating an example of the quantum communication method according to the first embodiment. The receiver 1 receives the cryptographic key bit string from the transmission side device via the quantum communication channel using the quantum state of a photon (step S1). Next, the sift processor 2 refers to the cryptographic key bit string in a predetermined bit string with the reference basis randomly selected from the bases to acquire the sift processing data (step S2).

Next, the receiver 1 receives part of the sift processing data from the transmission side device via the classical communication channel (conventional communication channel) that is not a quantum communication channel (step S3). Next, the estimator 3 performs the above-mentioned estimation processing of the estimated QbER (step S4). Next, the estimator 3 associates the sift processing data with the estimated QbER of the sift processing data, and transmits the sift processing data and the estimated QbER to the buffer 4 (step S5).

Next, the determination unit 5 determines whether the data volume of the sift processing data stored in the buffer 4 is equal to or greater than the first threshold (step S6). When the data volume is equal to or greater than the first threshold (step S6, Yes), the determination unit 5 (temporarily) determines the check matrix to be used for error correction of each piece of the sift processing data from the estimated QbER of each piece of the sift processing data (step S7). When the data volume is not equal to or greater than the first threshold (step S6, No), the determination unit 5 returns to the processing of step 5

Next, the determination unit 5 performs the above-mentioned correction order determination processing of the sift processing data (step S8). Next, the determination unit 5 performs the above-mentioned optimization processing of the groups (step S9). Next, the error corrector 7 performs the above-mentioned correction processing of the sift processing data (step S10). Next, the measurement unit 8 measures the QbER of the sift processing data by comparing the error correcting processing data with the sift processing data before the correction corresponding to the error correcting processing data (step S11). Next, the privacy amplifier 9 performs the privacy amplification processing of the error correcting processing data based on the measured QbER (step S12). Next, the privacy amplifier 9 generates the cryptographic key data to be shared with the transmission side device by using the bit string obtained by privacy amplification processing of the error correcting processing data (step S13).

As described above, the quantum communication device 100 according to the first embodiment includes the determination unit for determining the order of the sift processing data in which an error is to be corrected based on the estimated QbER, the range of the QbER that the check matrix can correct, the estimated correction time according to the range of the QbER of the check matrix, and the estimated switching time required for switching the check matrix, and for determining the check matrix to be used for correction. This allows the quantum communication device 100 of the present embodiment to reduce the error correcting time of the sift processing data, and to improve throughput of the quantum communication device 100.

The above-mentioned determination unit 5 of the first embodiment may determine the order in which an error is to be corrected in descending order of the average of the estimated QbERs from a group having a bigger average of the estimated QbERs. That is, the determination unit 5 may determine the order in which the groups are to be corrected sequentially from the group that uses the check matrix having higher error correcting capability.

Second Embodiment

Next, a second embodiment will be described. In the second embodiment, data stored in a storage 6 will be updated (optimized) by feeding back relevant data (correction time and QbER) obtained by performing processing in a quantum communication device 100. In the description of the second embodiment, description similar to description of the first embodiment will be omitted, and a different point from the first embodiment will be described in detail.

Figure 9:
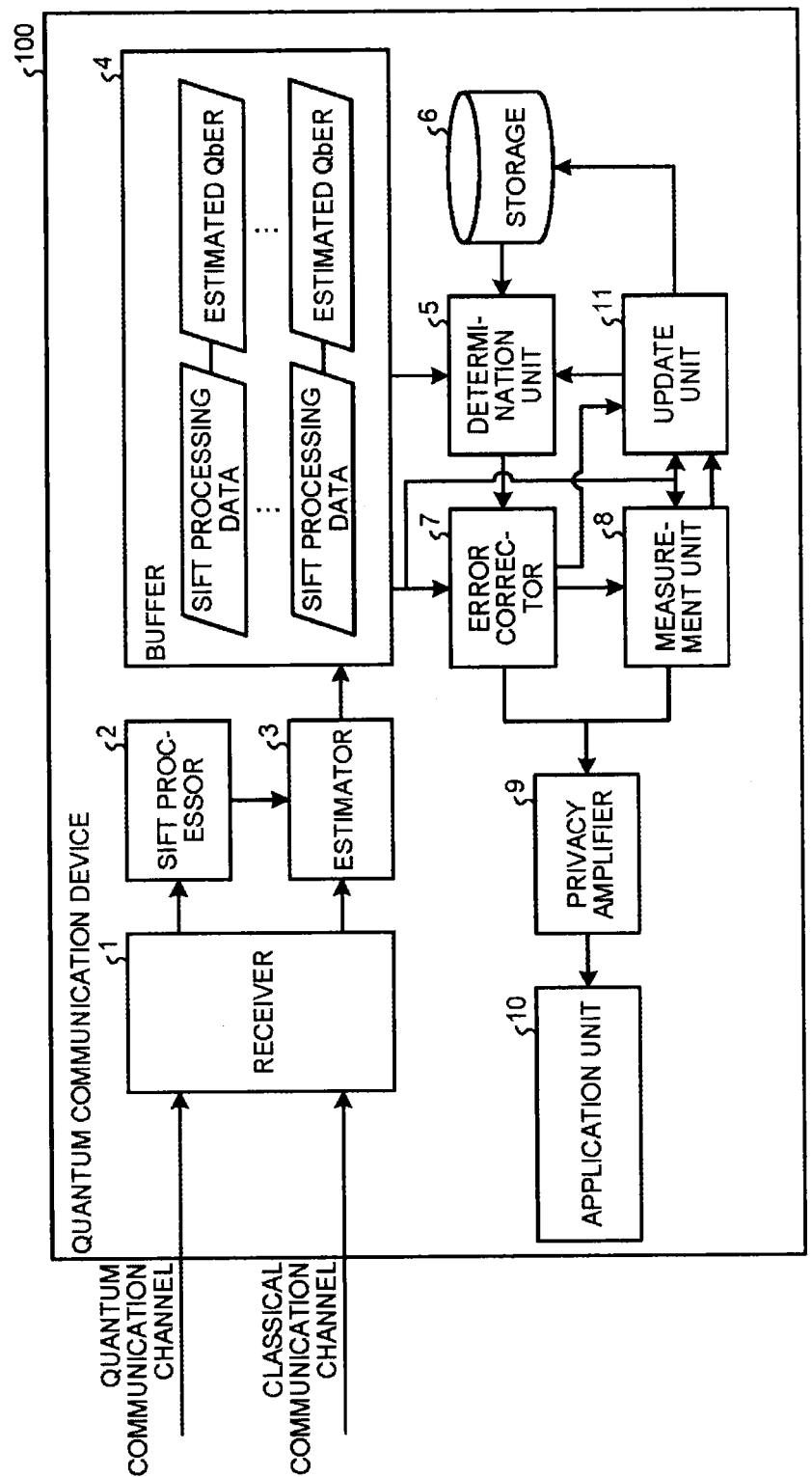
FIG. 9 is a diagram illustrating an example of the configuration of the quantum communication device according to a second embodiment.

FIG. 9 is a diagram illustrating an example of a configuration of the quantum communication device 100 according to the second embodiment. The quantum communication device 100 according to the second embodiment includes a receiver 1, a sift processor 2, an estimator 3, a buffer 4, a determination unit 5, the storage 6, an error corrector 7, a measurement unit 8, a privacy amplifier 9, an application unit 10, and an update unit 11. The receiver 1, the sift processor 2, the estimator 3, the buffer 4, the privacy amplifier 9, and the application unit 10 are identical to those of the first embodiment, and thus description will be omitted.

The determination unit 5 determines whether a data volume of sift processing data stored in the buffer 4 is equal to or greater than a first threshold. When the data volume of the sift processing data stored in the buffer 4 is equal to or greater than the first threshold, the determination unit 5 determines order of the sift processing data in which an error is to be corrected based on an estimated QbER associated with the sift processing data, an estimation error of the estimated QbER, a range of the QbER that a check matrix can correct, estimated correction time according to the range of the QbER of the check matrix, and estimated switching time required for switching the check matrix. The determination unit 5 also determines the check matrix to be used for correction when the data volume is equal to or greater than the first threshold. The determination unit 5 of the second embodiment determines the order of the sift processing data in which an error is to be corrected and the check matrix to be used for correction by using the estimated QbER after correction based on the estimation error of the estimated QbER without using the estimated QbER associated with the sift processing data as it is.

The estimation error of the estimated QbER will be described below. FIG. 10 is a diagram illustrating an example of the estimation error of the estimated QbER according to the second embodiment. FIG. 10 illustrates the estimation error for each range of the estimated QbER. For example, when the range of the estimated QbER is $0 \leq QbER < (5e-3)$, the estimation error is a. The estimation error is a value calculated by the update unit 11, which will be described later, based on a difference between the estimated QbER estimated by the estimator 3 and the QbER measured by the measurement unit 8. Details of the estimation error will be described later.

The determination unit 5 receives, from the update unit 11, a stop instruction of correction order determination processing and optimization processing of groups described in the first embodiment. On receipt of the stop instruction of the correction order determination processing and the optimization processing of groups, the determination unit 5 determines only the check matrix to be used for correction of the sift processing data. That is, the sift processing data in the buffer 4 is processed in time-series order by using the check matrix determined by the determination unit 5.

The storage 6 stores an estimated correction time database, an estimated switching time database, and an estimation error database. The estimated correction time database and the estimated switching time database are identical to those in the first embodiment, and thus description will be omitted. The estimation error database stores the estimation error of the estimated QbER (see FIG. 10).

The error corrector 7 receives, from the determination unit 5, data indicating the order of the sift processing data to be corrected and data indicating the check matrix to be used for correction of each piece of the sift processing data. The error corrector 7 performs correction processing of the sift processing data in the same manner as in the first embodiment. At this time, the error corrector 7 of the second embodiment acquires the correction time actually required for the correction processing of the sift processing data. The error corrector 7 transmits, to the update unit 11, correction information including the correction time, identification information for identifying the sift processing data in which the correction time is to be acquired, and identification information for identifying the check matrix used for correction.

The measurement unit 8 measures the QbER of the sift processing data in the same manner as in the first embodiment. At this time, the measurement unit 8 of the second embodiment transmits, to the update unit 11, measurement information including the QbER and identification information for identifying the sift processing data in which the QbER is to be measured.

The update unit 11 receives, from the error corrector 7, the correction information including the correction time, the identification information for identifying the sift processing data in which the correction time is to be acquired, and the identification information for identifying the check matrix used for correction. The update unit 11 receives, from the measurement unit 8, the measurement information including the QbER and the identification information for identifying the sift processing data in which the QbER is to be measured. The update unit 11 acquires, from the buffer 4, the estimated QbER associated with the sift processing data identified by the identification information about the sift processing data.

The update unit 11 specifies an estimated correction time field of the estimated correction time database by using the estimated QbER of the sift processing data and the identification information about the check matrix used for correction, and updates the estimated correction time field with the correction time received from the error corrector 7. The update unit 11 calculates the estimation error from a difference between the estimated QbER and the QbER. The update unit 11 calculates an average of the estimation errors for each range of the estimated QbER by using the plurality of calculated estimation errors, and updates the estimation error for each range of the estimated QbER with the average.

When a difference between the estimated correction time before update and the correction time (estimated correction time after update) is equal to or greater than a second threshold, the update unit 11 does not update the estimated correction time. Similarly, the update unit 11 does not update the estimation error when the average of the estimation errors is equal to or greater than a third threshold. Instead of updating (optimizing) the data stored in the storage 6, the update unit 11 transmits, to the determination unit 5, the above-described stop instruction for stopping the correction order determination processing and the optimization processing of the groups. This is because it is considered that an operating state of the correction processing of the error corrector 7, an operating state of the estimator 3 and the determination unit 5, and each database in the storage 6 lack consistency. That is, this is because, in such a state, it is better to perform maintenance work involving initialization of each database or the like, and to perform initialization (rebooting or the like) of the quantum communication device 100 than to feed back data obtained in actual correction processing and to update data in the storage 6.

Figure 11:
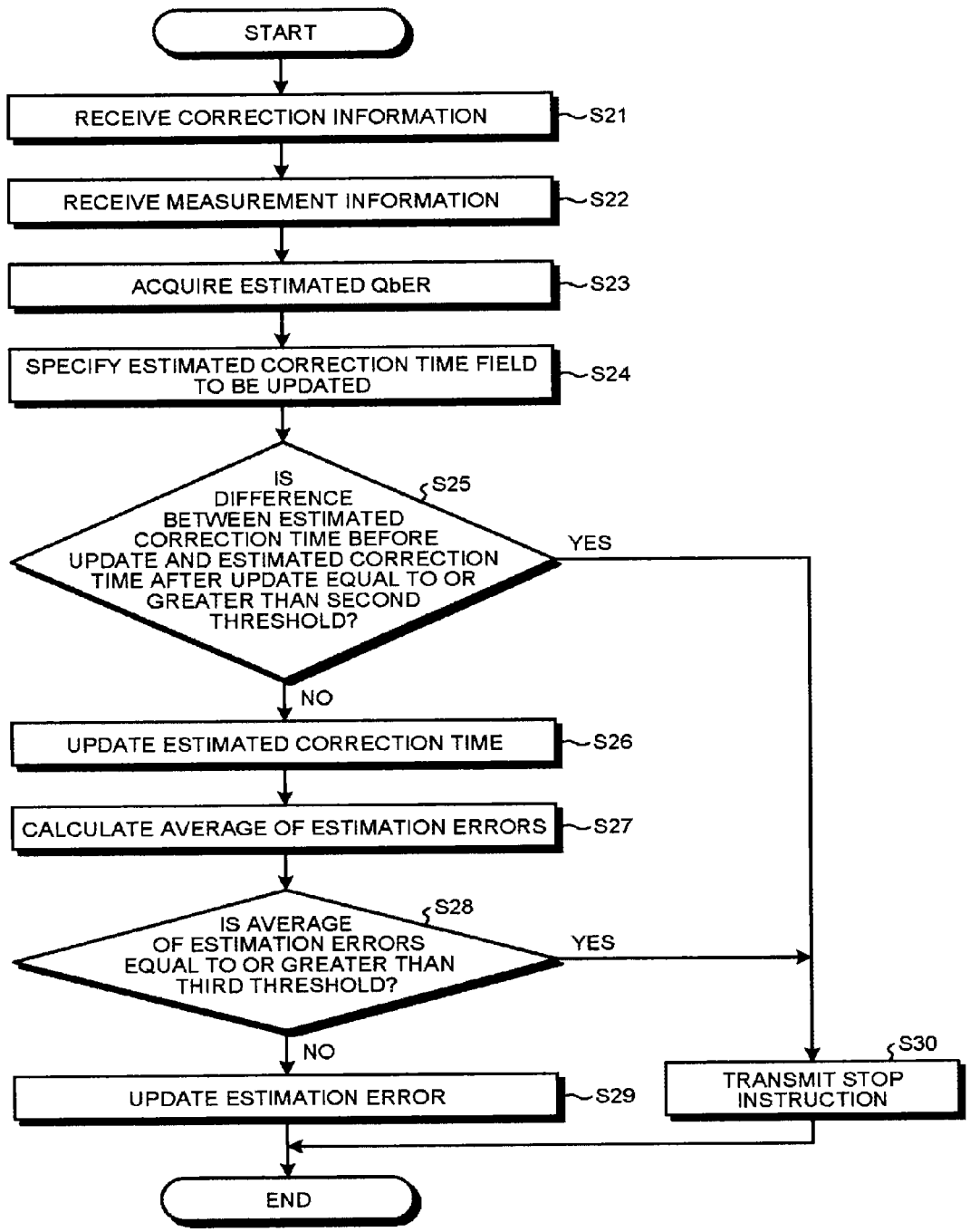
FIG. 11 is a flow chart illustrating an example of a method of operation of an update unit according to the second embodiment.

Next, an example of a method of operation of the update unit 11 of the second embodiment will be described with reference to a flow chart. FIG. 11 is a flow chart illustrating the example of the method of operation of the update unit 11 according to the second embodiment. The update unit 11 receives, from the error corrector 7, the correction information including the correction time, the identification information for identifying the sift processing data in which the correction time is to be acquired, and the identification information about the check matrix used for correction (step S21).

Next, the update unit 11 receives, from the measurement unit 8, the measurement information including the QbER and the identification information for identifying the sift processing data in which the QbER is to be measured (step S22). Next, the update unit 11 acquires, from the buffer 4, the estimated QbER associated with the sift processing data identified by the identification information about the sift processing data (step S23).

Next, the update unit 11 specifies the estimated correction time field of the estimated correction time database by using the estimated QbER of the sift processing data and the identification information about the check matrix used for correction (step S24). Next, the update unit 11 determines whether the difference between the estimated correction time before update and the correction time (estimated correction time after update) is equal to or greater than the second threshold (step S25). When the difference is equal to or greater than the second threshold (step S25, Yes), the update unit 11 transmits the above-described stop instruction for stopping the correction order determination processing and the optimization processing of the groups (step S30). When the difference is smaller than the second threshold (step S25, No), the update unit 11 updates the estimated correction time of the estimated correction time field specified in step S24 (step S26).

Next, the update unit 11 calculates the estimation error from the difference between the estimated QbER and the QbER, and calculates the average of the estimation errors for each range of the estimated QbER by using the plurality of calculated estimation errors (step S27). The update unit 11 determines whether the average of the estimation errors is equal to or greater than the third threshold (step S28). When the average is equal to or greater than the third threshold (step S28, Yes), the update unit 11 transmits the above-described stop instruction for stopping the correction order determination processing and the optimization processing of the groups (step S30). When the average is smaller than the third threshold (step S28, No), the update unit 11 updates the estimation error for each range of the estimated QbER with the average (step S29).

As described above, in the quantum communication device 100 according to the second embodiment, the update unit 11 specifies the estimated correction time field of the estimated correction time database by using the estimated QbER of the sift processing data and the identification information about the check matrix used for correction, and updates the estimated correction time field with the correction time received from the error corrector 7. The update unit 11 calculates the estimation error from the difference between the estimated QbER and the QbER, calculates the average of the estimation errors for each range of the estimated QbER by using the plurality of calculated estimation errors, and updates the estimation error for each range of the estimated QbER with the average. This allows the quantum communication device 100 of the second embodiment to optimize and improve processing of the estimator 3 and the determination unit 5.

Third Embodiment

Next, a third embodiment will be described. A quantum communication device 100 of the third embodiment receives a cryptographic key bit string from a plurality of devices. In the description of the third embodiment, description similar to description of the first embodiment will be omitted, and a different point from the first embodiment will be described in detail. The quantum communication device 100 of the third embodiment is used in a quantum access network (QAN) in which a key is shared by quantum key distribution by one-to-many nodes.

Figure 12:
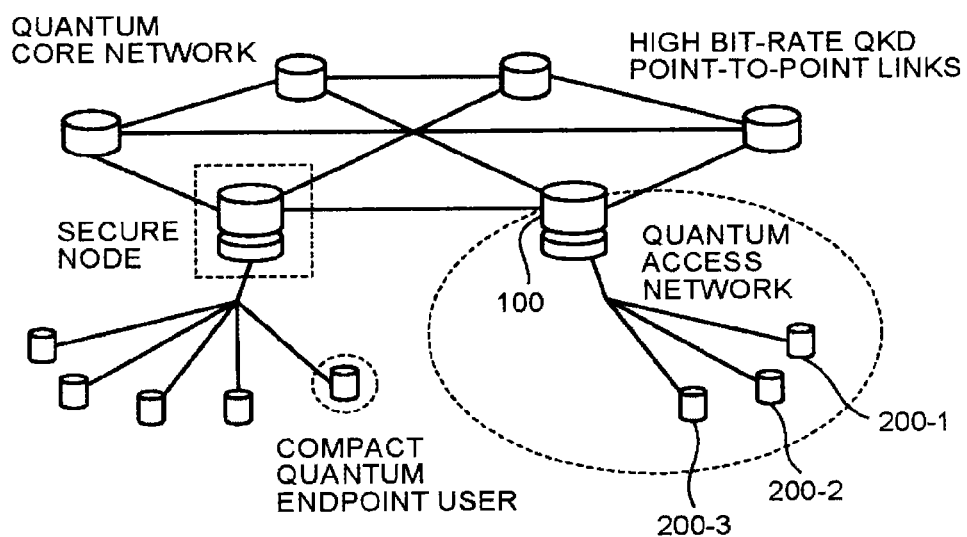
FIG. 12 is a diagram illustrating an example of a quantum access network (QAN) according to a third embodiment.

FIG. 12 is a diagram illustrating an example of the quantum access network (QAN). In the example of FIG. 12, the quantum communication device 100 is connected to a quantum core network (QCN). Three devices 200 that each transmit a cryptographic key bit string are connected to the quantum communication device 100. In the example of FIG. 12, the quantum access network (QAN) includes the quantum communication device 100 and the three devices 200. Here, the number of the devices 200 may be any number, but in the description of the present embodiment, the number of the devices 200 is assumed to be three for simplicity.

Figure 13:
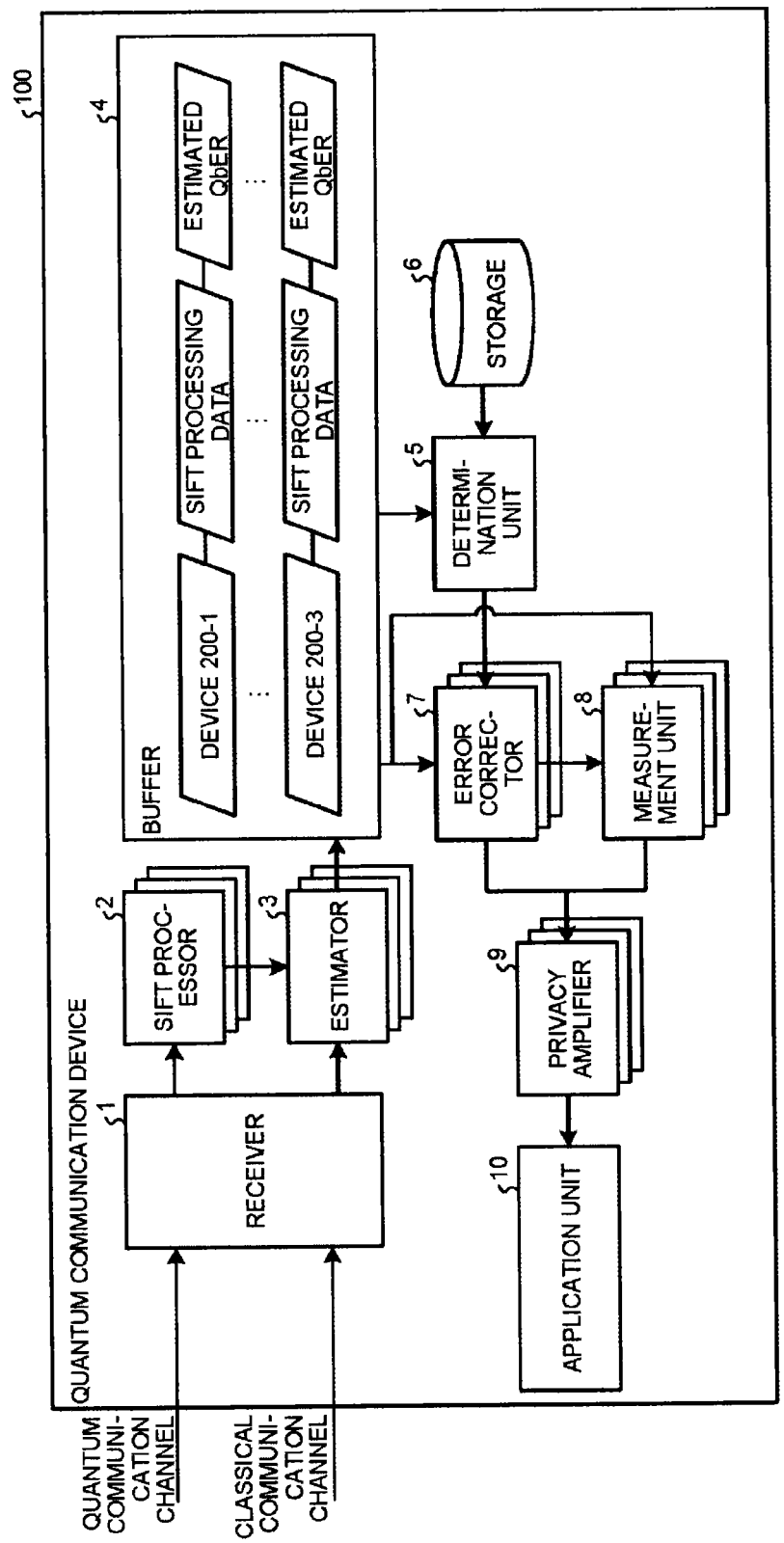
FIG. 13 is a diagram illustrating an example of the configuration of the quantum communication device according to the third embodiment.

FIG. 13 is a diagram illustrating an example of a configuration of the quantum communication device 100 according to the third embodiment. The quantum communication device 100 according to the third embodiment is configured such that, among components of the quantum communication device 100 of the first embodiment, sift processors 2, estimators 3, error correctors 7, measurement units 8, and privacy amplifiers 9 are multiplexed. This allows the quantum communication device 100 to generate cryptographic key data for each device 200 without delay even when receiving the cryptographic key bit string from the plurality of devices 200.

In the example of FIG. 13, the sift processors 2, the estimators 3, the error correctors 7, the measurement units 8, and the privacy amplifiers 9 are all multiplexed by the number of the transmission side devices 200 (three in the present embodiment). However, it is not necessary to set multiplicity identical to the number of the transmission side devices 200, and the multiplicity may be changed depending on a processing load of each functional block.

The buffer 4 further associates identification information for identifying the transmission side device 200 with sift processing data and an estimated QbER, and stores the identification information, the sift processing data, and the estimated QbER. The identification information about each device 200 is referred to when an application unit 10 identifies the cryptographic key data for each device 200.

The determination unit 5 determines order of the sift processing data in which an error is to be corrected in the same manner as in the first embodiment, and the check matrix used for correction, without referring to the identification information about the devices 200. That is, the determination unit 5 determines the order of the sift processing data in which an error is to be corrected by mixing the plurality of pieces of sift processing data generated from the cryptographic key bit strings transmitted from separate devices. The determination unit 5 transmits data indicating the order of the sift processing data to be corrected, and data indicating the check matrix used for correction of each piece of the sift processing data to the error corrector 7 having the smallest processing load among the three error correctors 7.

The error corrector 7 performs correction processing of the sift processing data in the same manner as in the first embodiment. At this time, the error corrector 7 acquires, from the buffer 4, one piece of sift processing data among the plurality of pieces of sift processing data and the identification information about the device 200 that transmits the sift processing data in the order determined by the determination unit 5. The error corrector 7 transmits error correcting processing data and the identification information about the device 200 to the privacy amplifier 9 having the smallest processing load among the three privacy amplifiers 9. The error corrector 7 transmits the error correcting processing data, the identification information about the device 200, and identification information for identifying the privacy amplifier 9 that transmits measured QbER to the measurement unit 8 having the smallest processing load among the three measurement units 8.

The measurement unit 8 receives, from the error corrector 7, the error correcting processing data, the identification information about the device 200, and the identification information for identifying the privacy amplifier 9 that transmits the measured QbER. The measurement. unit. 8 acquires the sift processing data before the correction corresponding to the error correcting processing data from the buffer 4. The measurement unit 8 measures the QbER of the sift processing data by comparing the error correcting processing data with the sift processing data before the correction corresponding to the error correcting processing data. The measurement unit 8 transmits the identification information about the device 200 and the measured QbER to the privacy amplifier 9 identified by the identification information about the privacy amplifier 9 received from the error corrector 7.

The privacy amplifier 9 receives the error correcting processing data and the identification information about the device 200 that transmits the sift processing data from the error corrector 7, and receives the identification information about the device 200 and the QbER of the error correcting processing data from the measurement unit 8. The privacy amplifier 9 performs privacy amplification processing of the error correcting processing data based on the QbER of the error correcting processing data. Then, the privacy amplifier 9 uses the bit string obtained by privacy amplification processing of the error correcting processing data to generate the cryptographic key data to be shared. The privacy amplifier 9 transmits the identification information about the device 200 and the cryptographic key data to the application unit 10.

The application unit 10 receives the identification information about the device 200 and the cryptographic key data from the privacy amplifier 9. The application unit 10 combines the cryptographic key data for each transmission side device 200, and performs encryption and decryption of data by using the cryptographic key data for each device 200. The application unit 10 transmits and receives the encrypted data with the transmission side device 200.

As described above, in the quantum communication device 100 of the third embodiment, the buffer 4 associates the identification information about the transmission side device 200 with the sift processing data and the estimated QbER, and stores the identification information, the sift processing data, and the estimated QbER. The determination unit 5, the error corrector 7, the measurement. unit. 8, and the privacy amplifier 9 perform processing without identifying the transmission side device 200, and generate the cryptographic key data. This allows the quantum communication device 100 of the third embodiment to perform the error correcting processing efficiently even when communicating with the plurality of devices 200.

In the quantum communication device 100 of the third embodiment, processing of the determination unit 5, the error corrector 7, the measurement unit 8, and the privacy amplifier 9 is performed without identifying the device 200, but the processing may be performed for each device 200.

In the quantum communication device 100 of the third embodiment, the determination unit 5 transmits data to the error corrector 7 having the smallest processing load among the three error correctors 7, but the data may be allocated to each error corrector 7 so that processing time becomes uniform. The determination unit 5 may allocate data so that all check matrices each used in the error corrector 7 are identical to each other. That is, the determination unit 5 may allocate the data to the respective error correctors 7 according to the check matrix used for correction of each piece of the sift processing data.

In the quantum communication device 100 of the third embodiment, the error corrector 7 transmits the error correcting processing data and the identification information about the device 200 to the privacy amplifier 9, but the error correcting processing data and the identification information about the device 200 may be transmitted from the measurement unit 8 to the privacy amplifier 9. This eliminates the need for the error corrector 7 to transmit the identification information for identifying the destination privacy amplifier 9 to the measurement unit 8.

In addition, a shared memory may be disposed between the plurality of error correctors 7 and the plurality of privacy amplifiers 9. That is, the error corrector 7 may store the error correcting processing data and the measured QbER in the shared memory, whereas the privacy amplifier 9 may acquire the error correcting processing data and the QbER stored in the shared memory.

The second embodiment and the third embodiment may be combined. That is, data stored in the storage 6 may be updated (optimized) by feeding back relevant data (correction time and QbER) obtained by performing processing in the quantum communication device 100. At this time, optimization may be performed without identifying the transmission side device 200, and optimization may be performed for each transmission side device 200. When optimization is performed for each transmission side device 200, correction processing of the estimated QbER and temporary determination processing of the check matrix by the determination unit 5, and processing by the measurement unit 8 are performed by identifying the transmission side device 200. Then, identification is made regarding which device 200 the relevant data used for feedback is about.

Figure 14:
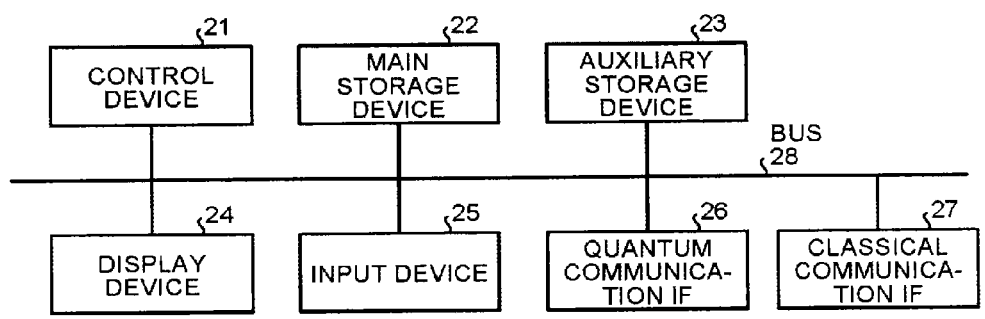
FIG. 14 is a diagram illustrating an example of the configuration of the quantum communication device according to the first to third embodiments.

Finally, an example of a hardware configuration of the quantum communication device 100 of the first to third embodiments will be described. FIG. 14 is a diagram illustrating the example of the configuration of the quantum communication device 100 according to the first to third embodiments. The quantum communication device 100 according to the first to third embodiments includes a control device 21, a main storage device 22, an auxiliary storage device 23, a display device 24, an input device 25, a quantum communication IF 26, and a classical communication IF 27. The control device 21, the main storage device 22, the auxiliary storage device 23, the display device 24, the input device 25, the quantum communication IF 26, and the classical communication IF 27 are connected to each other via a bus 28. The quantum communication device 100 may be an arbitrary device that has the above-described hardware configuration. For example, the quantum communication device 100 is a personal computer (PC), a mobile terminal, and the like.

The control device 21 executes a program read from the auxiliary storage device 23 to the main storage device 22. The main storage device 22 is a memory such as a ROM and a RAM. The auxiliary storage device 23 is a hard disk drive (HDD), a memory card, and the like. The display device 24 displays a state of the quantum communication device 100 or the like. The input device 25 receives an input from a user. The quantum communication IF 26 is an interface for connection to a quantum communication channel. The classical communication IF 27 is an interface for connection to a classical communication channel.

The program executed in the quantum communication device 100 of the first to third embodiments is an installable file or an executable file. The program is stored in a computer-readable storage medium such as a CD-ROM, a memory card, a CD-R, and a digital versatile disk (DVD), and is provided as a computer program product.

The program executed in the quantum communication device 100 of the first to third embodiments may be configured to be stored in a computer connected to a network, such as the Internet, and to be provided by allowing download via the network. The program executed in the quantum communication device 100 of the first to third embodiments may be configured to be provided via the network, such as the Internet, without allowing download.

The program of the quantum communication device 100 of the first to third embodiments may be configured to be incorporated in a ROM or the like in advance and to be provided.

The program executed in the quantum communication device 100 of the first to third embodiments has a modular configuration including the above-described respective functional blocks (receiver 1, sift processor 2, estimator 3, determination unit 5, error corrector 7, measurement unit 8, privacy amplifier 9, application unit 10, and update unit 11). As actual hardware, the respective functional blocks are loaded in the main storage device 22 by the control device 21 reading the program from the storage medium and executing the program. That is, the respective functional blocks are generated in the main storage device 22.

Part or all of the above-described respective units (receiver 1, sift processor 2, estimator 3, determination unit 5, error corrector 7, measurement unit 8, privacy amplifier 9, application unit 10, and update unit 11) may not be achieved by software but may be achieved by hardware, such as an integrated circuit (IC).

As described above, the quantum communication device 100 of the first to third embodiments can reduce processing time required for error correction of the sift processing data and improve throughput of the quantum communication device 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum communication device comprising:
   a receiver configured to
      receive a cryptographic key bit represented by one basis among a plurality of bases using a quantum state of a photon via a quantum communication channel, and
      acquire a cryptographic key bit string including a plurality of received cryptographic key bits;
   a sift processor configured to acquire sift processing data by referring to the cryptographic key bit string in a predetermined bit string with a reference basis randomly selected from the plurality of bases;
   an estimator configured to acquire an estimated error rate by estimating an error rate of the sift processing data from an error rate of part of the sift processing data;
   a first storage configured to store the sift processing data and the estimated error rate in association with each other;

a second storage configured to store a check matrix for checking the sift processing data, a range of an error rate that the check matrix can correct, estimated correction time according to the range of the error rate of the check matrix, and an estimated switching time required for switching the check matrix so that the check matrix, the range of the error rate, the estimated correction time, and the estimated switching time are associated with one another;

a determination unit configured to
  determine order of the sift processing data in which an error is to be corrected based on the estimated error rate, the range of the error rate that the check matrix can correct, the estimated correction time, and the estimated switching time and
  determine the check matrix to be used for correction when a data volume of the sift processing data stored in the first storage is equal to or greater than a first threshold;

a corrector configured to
  acquire one piece of the sift processing data from among the plurality of pieces of sift processing data from the first storage in the order determined by the determination unit, and
  generate error correcting processing data by correcting the acquired sift processing data by using the check matrix determined by the determination unit;

a measurement unit configured to measure the error rate of the sift processing data before correction by comparing the error correcting processing data with the sift processing data before the correction corresponding to the error correcting processing data; and a privacy amplifier configured to generate cryptographic key data by applying privacy amplification processing to the error correcting processing data based on the error rate measured by the measurement unit.

2. The device according to claim 1, wherein
the receiver is configured to receive part of the sift processing data via a classical communication channel from a transmission side device that transmits the cryptographic key bit string, and
the estimator is configured to acquire the estimated error rate of the sift processing data based on data corresponding to part of the sift processing data received via the classical communication channel among the sift processing data acquired by the sift processor, and on part of the sift processing data received by the receiver via the classical communication channel.

3. The device according to claim 1, wherein
the determination unit is configured to
  create one or more groups that each include the sift processing data that uses the identical check matrix,
  calculate an average of the estimated error rates for each of the groups from the estimated error rate of the sift processing data included in each of the groups, and
  determine order of the groups in which an error is to be corrected in ascending order of the average of the estimated error rates from each of the groups having the smaller average of the estimated error rates.

4. The device according to claim 3, wherein the determination unit is configured to determine, sequentially from each of the groups having the smaller average of the estimated error rates, whether to change the check matrix used for correction of the sift processing data included in each of the groups into a check matrix to be used in each of the groups to be corrected next, based on the estimated correction time and the estimated switching time when the check matrix is not changed, and on the estimated correction time when the check matrix is changed.

5. The device according to claim 1, wherein
the determination unit is configured to
  create one or more groups that each include the sift processing data that uses the identical check matrix,
  calculate an average of the estimated error rates for each of the groups from the estimated error rate of the sift processing data included in each of the groups, and
  determine order of the groups in which an error is to be corrected in descending order of the average of the estimated error rates from each of the groups having the bigger average of the estimated error rates.

6. The device according to claim 1, wherein
the corrector is configured to acquire correction time indicating time required for generation of the error correcting processing data, and
the device further comprises an update unit configured to specify the estimated correction time to be updated in the second storage by using the estimated error rate of the sift processing data in which the correction time is to be acquired and the check matrix used for correction, and update the specified estimated correction time with the correction time.

7. The device according to claim 6, wherein,
the update unit is configured to transmit, to the determination unit, a stop notification for stopping processing for determining the order of the sift processing data in which an error is to be corrected without updating the specified estimated correction time with the correction time, when a difference between the specified estimated correction time and the correction time is equal to or greater than a second threshold, and
the determination unit is configured to stop, on receipt of the stop notification, processing for determining the order of the sift processing data in which an error is to be corrected.

8. The device according to claim 6, wherein
the second storage is configured to further store an estimation error of the estimated error rate,
the update unit is configured to
  calculate the estimation error from a difference between the estimated error rate and the error rate measured by the measurement unit,
  use the plurality of calculated estimation errors to calculate an average of the estimation errors for each range of the estimated error rate, and
  update each of the estimation errors for each range of the estimated error rate with the average of the estimation errors, and
the determination unit is configured to determine the order of the sift processing data in which an error is to be corrected and the check matrix used for correction, further based on each of the estimation errors in the second storage.

9. The device according to claim 8, wherein,
the update unit is configured to transmit, to the determination unit, the stop notification for stopping processing for determining the order of the sift processing data in which an error is to be corrected without updating each of the estimation errors for each range of the estimated error rate with the average of the estimation errors when the average of the estimation errors is equal to or greater than a third threshold, and the determination unit is configured to stop, on receipt of the stop notification, processing for determining the order of the sift processing data in which an error is to be corrected.

10. A quantum communication method comprising:
receiving a cryptographic key bit represented by one basis among a plurality of bases using a quantum state of a photon via a quantum communication channel;
acquiring a cryptographic key bit string including a plurality of received cryptographic key bits;
acquiring sift processing data by referring to the cryptographic key bit string in a predetermined bit string with a reference basis randomly selected from the plurality of bases;
acquiring an estimated error rate by estimating an error rate of the sift processing data from an error rate of part of the sift processing data;
storing, in a first storage, the sift processing data with the estimated error rate in association with each other;
storing, in a second storage, a check matrix for checking the sift processing data with a range of an error rate that the check matrix can correct, estimated correction time according to the range of the error rate of the check matrix, and an estimated switching time required for switching the check matrix so that the check matrix, the range of the error rate, the estimated correction time, and the estimated switching time are associate with one another;
determining order of the sift processing data in which an error is to be corrected based on the estimated error rate, the range of the error rate that the check matrix can correct, the estimated correction time, and the estimated switching time;
determining the check matrix to be used for correction when a data volume of the sift processing data stored in the first storage is equal to or greater than a first threshold;
acquiring one piece of the sift processing data from among the plurality of pieces of sift processing data from the first storage in the order determined;
generating error correcting processing data by correcting the acquired sift processing data by using the check matrix determined;
measuring the error rate of the sift processing data before correction by comparing the error correcting processing data with the sift processing data before the correction corresponding to the error correcting processing data; and
generating cryptographic key data by applying privacy amplification processing to the error correcting processing data based on the measured error rate.

11. A computer program product comprising a non-transitory computer-readable medium containing a program, the program causing a computer to execute:
receiving a cryptographic key bit represented by one basis among a plurality of bases using a quantum state of a photon via a quantum communication channel;
acquiring a cryptographic key bit string including a plurality of received cryptographic key bits;
acquiring sift processing data by referring to the cryptographic key bit string in a predetermined bit string with a reference basis randomly selected from the plurality of bases;
acquiring an estimated error rate by estimating an error rate of the sift processing data from an error rate of part of the sift processing data;
storing, in a first storage, the sift processing data with the estimated error rate in association with each other;
storing, in a second storage, a check matrix for checking the sift processing data with a range of an error rate that the check matrix can correct, estimated correction time according to the range of the error rate of the check matrix, and an estimated switching time required for switching the check matrix so that the check matrix, the range of the error rate, the estimated correction time, and the estimated switching time are associate with one another;
determining order of the sift processing data in which an error is to be corrected based on the estimated error rate, the range of the error rate that the check matrix can correct, and the estimated correction time, and the estimated switching time;
determining the check matrix to be used for correction when a data volume of the sift processing data stored in the first storage is equal to or greater than a first threshold;
acquiring one piece of the sift processing data from among the plurality of pieces of sift processing data from the first storage in the order determined;
generating error correcting processing data by correcting the acquired sift processing data by using the check matrix determined;
measuring the error rate of the sift processing data before correction by comparing the error correcting processing data with the sift processing data before the correction corresponding to the error correcting processing data; and
generating cryptographic key data by applying privacy amplification processing to the error correcting processing data based on the measured error rate.

* * * * *